No. 727,285. PATENTED MAY 5, 1903.
J. P. CALDWELL.
PLANTER.
APPLICATION FILED JULY 10, 1902.
NO MODEL. 2 SHEETS—SHEET 1.

WITNESSES:

INVENTOR
James Philo Caldwell
BY
ATTORNEYS.

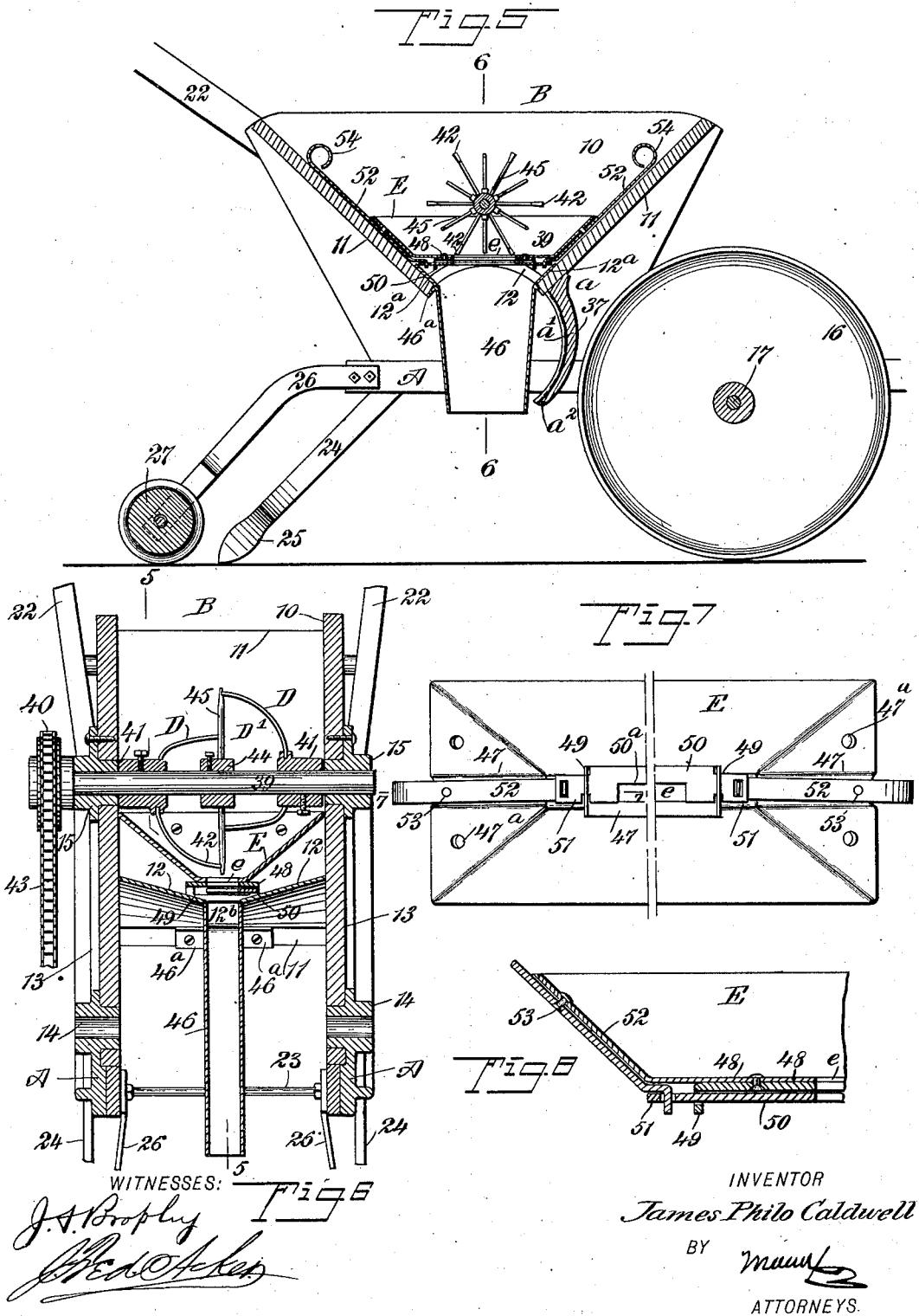

No. 727,285.

Patented May 5, 1903.

UNITED STATES PATENT OFFICE.

JAMES PHILO CALDWELL, OF WINNSBORO, SOUTH CAROLINA.

PLANTER.

SPECIFICATION forming part of Letters Patent No. 727,285, dated May 5, 1903.

Application filed July 10, 1902. Serial No. 115,030. (No model.)

*To all whom it may concern:*

Be it known that I, JAMES PHILO CALDWELL, a citizen of the United States, and a resident of Winnsboro, in the county of Fairfield and State of South Carolina, have invented a new and Improved Planter, of which the following is a full, clear, and exact description.

My invention relates to an improvement upon the planter a patent for which was granted to me February 20, 1900, No. 643,942.

The purpose of the invention is to so construct the seed-planting wheel that it may be used at will for planting cotton-seed or such smaller seed as peas and corn, the dropping mechanism of the wheel being automatically operated, and to provide means whereby any portion of the said seed-dropping mechanism may be rendered inactive, so that larger or smaller seed may be planted or the seed planted at desired intervals apart, thus dispensing with the necessity of chopping out the rows of cotton-plants, for example, after the plants have grown.

Another purpose of the invention is to so construct the machine that a furrow will be opened and the seed automatically covered and the covering rolled down and, further, to construct the machine in such manner that it may be utilized for distributing fertilizing material in greater or less quantities and also to provide agitating devices for the bulk of the seed and the fertilizing material.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
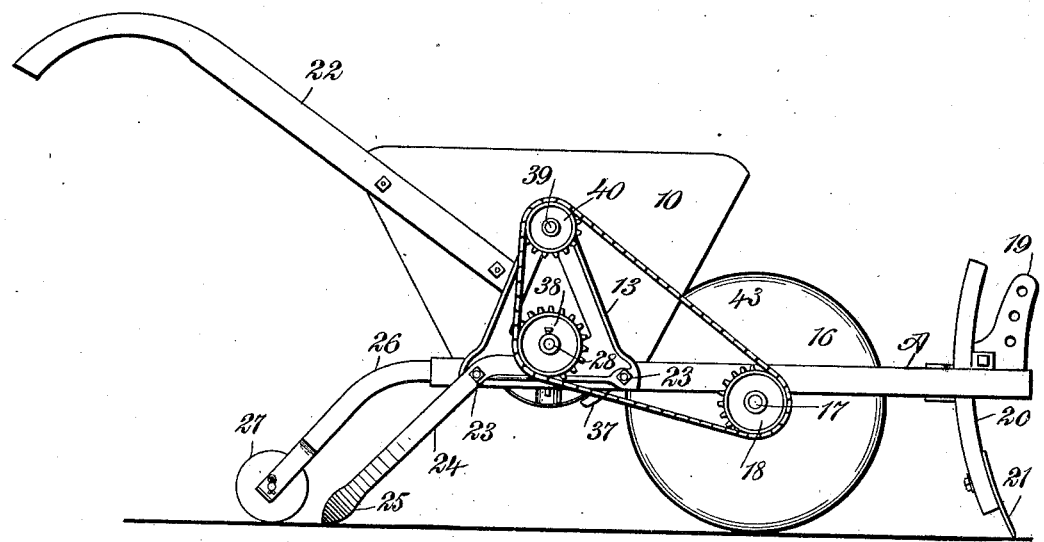
Figure 2:
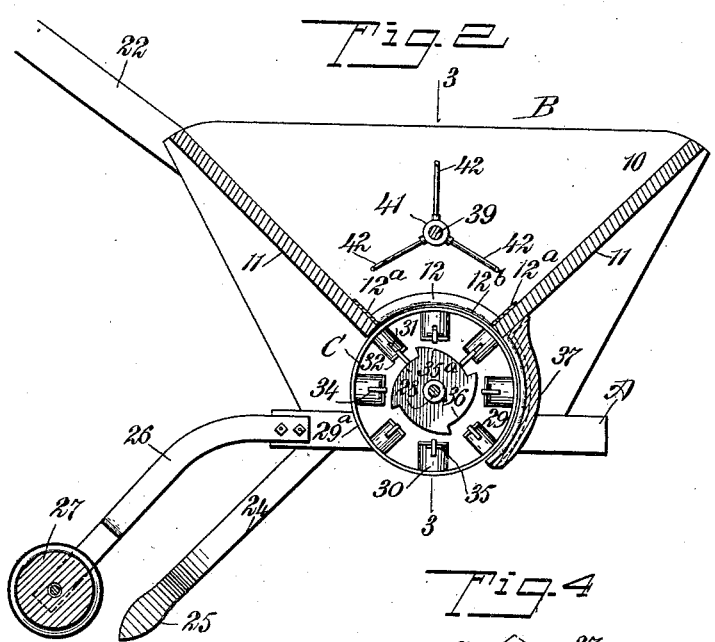
Figure 3:
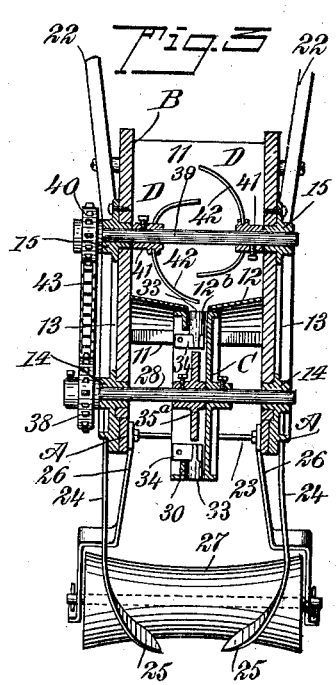
Figure 4:
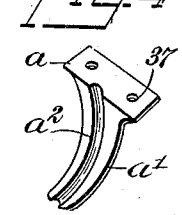

Figure 1 is a side elevation of the improved machine adapted as a planter. Fig. 2 is a vertical section through the rear portion of the machine, showing the seed-dropping wheel in side elevation. Fig. 3 is a vertical transverse section taken practically on the line 3 3 of Fig. 2. Fig. 4 is a perspective view of the guard employed in connection with the seed-dropping wheel. Fig. 5 is a longitudinal vertical section through the rear portion of the machine, showing its adaptation as a fertilizer-distributer, the section being taken practically on the line 5 5 of Fig. 6. Fig. 6 is a transverse vertical section taken practically on the line 6 6 of Fig. 5. Fig. 7 is a bottom plan view of the tray which is introduced into the hopper of the machine when the machine is to be used for distributing fertilizing material, and Fig. 8 is a vertical longitudinal section through an end portion of the tray.

A represents a horizontal skeleton frame, from the the rear portion of which substantially triangular side boards 10 are carried upward in parallelism, and these side boards 10 are connected at the front and at the rear by partitions 11, which incline downward in direction of each other, being separated at their lower ends, which partitions, together with the side boards 10, constitute a hopper B. The space between the front and rear inclined partitions 11 is bridged by an upwardly-arched partition 12, having flanges $12^a$, which are attached to the inner faces of the inclined end partitions 11, and at the central portion of the arched bottom 12 of the hopper B a longitudinal slot $12^b$ is produced.

At the outer surface of each side board 10 of the hopper B substantially triangular skeleton frames 13 are located, and these frames 13 are preferably made of metal, the upper ends of the frames being contracted and located centrally with respect to the front and rear edges of the side boards 10, and the bottom or base portions of the metal frames 13 are attached to the main frame A, as is shown in Fig. 1.

At the central portion of the base of each metal frame 13 a bearing 14 is formed, which extends into the sides 10 of the hopper at a point below the bottom thereof, as is shown in Figs. 3 and 6, and at the upper portion of each skeleton frame 13 a second bearing 15 is formed, extending through the said sides of the hopper into the same, as is also shown in Figs. 3 and 6, so that the frames 13 may be properly called "bearing-frames."

The main frame A is provided with a supporting-wheel 16, located in front of the hopper and mounted upon a suitable axle 17, journaled in proper bearings carried by the main frame A, and at one end of the axle 17 a sprocket-wheel 18 is secured.

At the forward end of the main frame A a clevis 19 is located, and a standard 20 is carried by the main frame at the rear of the clevis 19. A furrow-opener 21, of any suitable construction, is secured to the lower end of the said standard 20, as is shown in Fig. 1. Handles 22 are secured to the side portions of the hopper B, extending upwardly and rearwardly therefrom, as is also shown in Fig. 1, and the side sections 10 of the hopper B at their lower portions, and likewise the rear portions of the main frame A, are strengthened by suitable bolts 23. These bolts serve likewise to hold the bearing-frames 13 in position on the main frame.

Furrow-closers are located at the rear of the main frame A. These furrow-closers consist of shank members 24, which are secured to the main frame A at the rear portion of the said frame and extend downward and rearward, their lower ends being curved inward in direction of each other, and the said lower ends are more or less spoon-shaped, as is shown at 25 in Figs. 1, 2, and 3, so as to gather up the dirt and distribute the dirt thus gathered over the seed deposited in the furrow made by the furrow-opener 21.

In addition to the covering devices just described means are provided for packing the earth loosely deposited by the covering devices on the seed, and said packing devices consist of arms 26, which likewise extend from the rear end of the frame A downward and rearward, widening at their lower portion, as is shown best in Fig. 3, and between the wider portions of the arms 26 a roller 27 is mounted to turn, which roller is longitudinally concaved. Preferably the arms of the covering devices are attached to the outer faces of the main frame A, and the arms for the packing device are attached to the inner faces of said main frame, as is also shown in Fig. 3.

A shaft 28 is removably placed in the bearings 14, and on the said shaft 28 a seed-drop wheel C is securely yet removably fastened. The said wheel is so placed that its periphery is located just below the slot $12^b$ in the arched bottom of the hopper B. The seed-drop wheel C consists of a disk body 29, having a peripheral flange extending beyond one of its faces, and upon the said disk body within the said disk flange and in engagement with said flange a series of cylinders 30 is formed. These cylinders are preferably in sets of different diameters, some of the cylinders being large and the others small. The larger cylinders are adapted to be used when cotton-seed or seed of similar character is to be planted, and the smaller cylinders are brought into operation when smaller seed, such as corn or peas, are to be planted. As shown, the large and the small cylinders are alternately arranged. An opening is made in the peripheral flange of the seed-drop wheel at the outer end of each cylinder, and each cylinder 30 is provided with a longitudinal slot 31 at its outer face extending from a point near its center through its inner edge in communication with the interior of the cylinder, and said slot is likewise carried through a transverse flange 32, likewise located at the outer face of each cylinder at its inner end.

Within each cylinder 30 a plunger 33 is mounted to loosely slide, and at the inner portion of each plunger a wing 34 extends out loosely through the slot 31 in the cylinder receiving the plunger, and when the plunger is not in use it is held within this cylinder with its outer end flush with the outer peripheral surface of the seed-drop wheel by means of a cotter-pin 35 or its equivalent passed through a suitable aperture in the wing 34 of the plunger at a point above the flange 32 of the cylinder; but when a cylinder is in use the plunger of the cylinder operates through gravity the moment the cotter-pin 35 is removed.

A ratchet-wheel $35^a$ is secured on the shaft 28 within the line of cylinders 30, as is shown in Figs. 2 and 3, and a tooth of the said ratchet-wheel is brought beneath each plunger of each cylinder 30 that is required to be used when the cotter-pins 35 or their equivalents are removed. The teeth 36 of the ratchet-wheel $35^a$ are curved, the curvature of each tooth rising gradually from the higher portion of the next tooth, and when the ratchet-wheel $35^a$ is so turned on the shaft 28 as to bring the crown portion of a tooth opposite a plunger the plunger can drop but a slight distance out from its cylinder, and consequently only a small quantity of seed can be taken up by the cylinder; but when the ratchet-wheel $35^a$ is adjusted to bring the plunger of a cylinder opposite that portion of a tooth connecting with the rising section of an adjacent tooth the plunger of the cylinder will leave the said cylinder a sufficient distance to enable the cylinder to hold a quantity of seed, and in this manner, through the adjustment of the ratchet-wheel $35^a$, the plungers may be set so that the cylinders will receive a greater or a less quantity of seed for planting.

In order to prevent the seed from dropping from the cylinders as the seed-drop wheel C is revolved and until the cylinder reaches practically a lower vertical position, a guard 37 is attached to the forward portion of the hopper B, extending downward along the front of the seed-drop wheel in quite close relation thereto, being curved correspondingly to the wheel, and in order that the seed shall not drag or wear against the guard 37 the said guard is provided in its curved body portion $a'$ with a central longitudinal channel $a^2$, and at the top of the body $a'$ of the guard a flange $a$ is provided, adapted for attachment to the hopper, as is shown in Figs. 2 and 4.

A sprocket-wheel 38 is attached to the outer end of the shaft 28, and a similar wheel 40 is attached to the outer end of the upper shaft 39, journaled in the upper bearings 15 of the bearing-frame 13, and both of the shafts 39 and 28 are driven by a chain belt 43, engaging the sprocket-wheels 38 and 40, being passed over the sprocket-wheel 18 on the shaft 17 of the supporting-wheel 16. The upper shaft 39 is an agitator-shaft, and, as shown in Figs. 3 and 6, carries agitators D within the hopper B. These agitators consist of sleeves 41, adjustably secured on the shaft 39 by set-screws or their equivalents, and curved fingers 42, which extend from the said sleeves, the fingers of the two sleeves being curved in direction of each other, yet the sleeves are so adjusted on the shaft 39 as to bring the fingers of one sleeve between the fingers of the opposing sleeve. In this manner it is obvious that the seed in the hopper will not cling together, as it will be thoroughly separated by the action of the stirrers or agitators D.

The toothed wheel 35$^a$ may properly be termed a "controlling-wheel," as by its adjustment the depth of the seed-receiving cylinders 30 is regulated, and consequently the amount of seed dropped by each of said cylinders.

In the adaptation of the machine for distributing fertilizing material, an auxiliary stirrer or agitator D' is secured upon the shaft 39 between the initial stirrers or agitators D, as is shown in Figs. 5 and 6, and said auxiliary stirrer D' consists of a sleeve 44, secured upon the shaft 39, and radial fingers 45, extending in a preferably straight line from the sleeve, the outer ends of which fingers are usually more or less pointed. The seed-drop wheel C is removed, and likewise its shaft 28, and in its stead a vertical chute 46 is substituted, its upper portion fitting to the convexed bottom 12 of the hopper B, as is shown in Fig. 5, and said chute is attached to the bottom portions of the forward and rear partitions 11 of the said hopper B through extensions 46$^a$, as is also shown in Figs. 5 and 6. Further, when the machine is to be used for distributing fertilizing material a tray E is employed in the bottom portion of the hopper B, whereby to control the quantity of material passing through the chute 46 in a given length of time. This tray is shown in Figs. 5, 6, 7, and 8 and is fitted to the bottom portion of the hopper B, being usually temporarily attached to the front and rear partitions 11 of the hopper by screws or like devices passed through apertures 47$^a$ in its ends, and at the under side of the end sections of the tray longitudinal depressions 47 are produced. (Best shown in Fig. 7.)

In the central portion of the bottom of the tray E a longitudinal opening e is produced, and this opening at the under surface of the tray is surrounded and the tray at such point is reinforced by a stout plate 48, having an opening therein corresponding to and registering with the opening e in the bottom of the tray. The said reinforcing-plate 48 has downwardly-extending end flanges 49, slotted to admit of the free passage through them of end extensions 51 from a cut-off plate 50, having a recess 50$^a$ in its inner edge corresponding to the opening e in the bottom of the tray E. This cut-off plate is adapted to slide to and from the opening e in the bottom of the tray E and the corresponding opening in the reinforcing-plate 48 to open or close said openings partially or entirely. The cut-off plate 50 is operated through the medium of levers 52, loosely connected with the end extensions 51 of the cut-off plate 50, which levers are located in the depressions 47 and are pivoted to the tray E near their outer ends by suitable pivots 53. The levers 52 extend up beyond the ends of the tray and terminate at their upper extremities in handles 54. When the tray E is in position in the hopper B, the projecting portions of the levers 52 rest upon the ends of the hopper, as is shown in Fig. 5, and the handle ends of the levers are readily accessible to adjust the cut-off plate when desired.

When the machine is used to distribute fertilizing material, the driving-belt of the machine is passed directly from the sprocket-wheel 40 on the shaft 39 to the sprocket-wheel 18 on the shaft of the supporting-wheel 16.

Having thus described my invention, I claim as new and desire to secure by Letters Patent—

1. In a planter, a suitable hopper for the seed to be planted, a seed-drop wheel having measuring-cylinders in communication with the interior of said hopper, to receive and convey therefrom a predetermined quantity of seed for each hill to be planted, said cylinders having their outlet-openings around the periphery of the seed-drop wheel and a rigid curved guard for said wheel extending over its front periphery from the hopper to the point where it is desired to discharge the seed into the furrow, said guard having a longitudinal channel on its inner face extending from the top to the bottom thereof in registration with the path of the measuring-cylinders, to prevent solid seeds from being bruised or crushed against said guard by the revolving of the wheel as specified.

2. In a planter, a hopper having an opening in its bottom, a removable shaft located below the said opening of the hopper, a seed-drop wheel mounted on said shaft, carrying cylinders, said cylinders being an equal distance from each other and made in two sizes, a larger and a smaller, the large and small cylinders being alternately arranged around the periphery of the seed-drop wheel, gravity-plungers operating in the cylinders to expel the seed therefrom, the said cylinders extending to the outer peripheral surface of the wheel and each provided with independent means whereby it may be thrown out of operative relation to the planter, a controlling-wheel mounted on the same shaft with the seed-drop wheel and provided with curved teeth adapted to engage with the inner ends of the plungers of the said cylinders, as set forth.

3. In a planter, a hopper having an opening in its bottom, a removable shaft located below the said opening of the hopper, a seed-drop wheel mounted on said shaft and carrying two sets of cylinders, comprising a main set, four in number and of equal size arranged equidistant from each other around the periphery of the wheel, and an auxiliary set of smaller-sized cylinders also four in number and of equal size with each other and arranged around the periphery of the wheel midway between the cylinders of the main set, the inner ends of both sets of cylinders being the same distance from the center of the seed-drop wheel, gravity-plungers of equal length operating in the cylinders, the said cylinders opening on the outer peripheral surface of the wheel and each adapted to be thrown out of operative relation to the planter, a controlling-wheel mounted on the same shaft with the seed-drop wheel and provided with inclined teeth adapted to engage the inner ends of the plungers of said cylinders, and a rigid guard for said wheel having a longitudinal channel extending the entire length of its inner face, said guard extending down the front periphery of the wheel from the hopper to the point where it is desired to discharge the seed into the furrow, as specified and for the purpose set forth.

4. The combination with a planter having a suitable hopper for the seed to be planted, a seed-drop wheel having measuring-cylinders in communication with the interior of said hopper to receive and convey therefrom a predetermined quantity of seed for each hill to be planted, said cylinders having their outlet-openings around the periphery of the seed-drop wheel, and gravity-plungers in said cylinders to expel the seed therefrom, said cylinders being each provided with independent means whereby they may be thrown out of operative relation to the planter, of a rigid guard for said wheel extending down the front periphery thereof from the hopper to the point where it is desired to discharge the seed into the furrow, said guard having a small longitudinal channel extending the entire length of its inner face and in registration with the path of the measuring-cylinders, whereby the gravity-plungers in the cylinders hold the seed therein in firm contact with the inner face of said guard, ready to be suddenly discharged therefrom when the end of the guard is reached without subjecting the seed to the danger of being crushed between said wheel and guard, as set forth.

In testimony whereof I have signed my name to this specification in the presence of two subscribing witnesses.

JAMES PHILO CALDWELL.

Witnesses:
S. T. BEATY,
WILEY L. DERRICK.